July 28, 1959
O. A. GUZMANN
2,896,654
TORSIONALLY MOUNTED JET PIPE RELAY
Filed Aug. 11, 1958
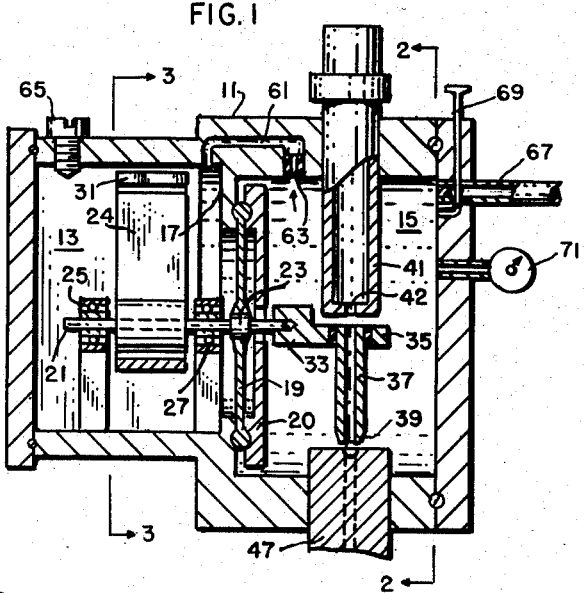
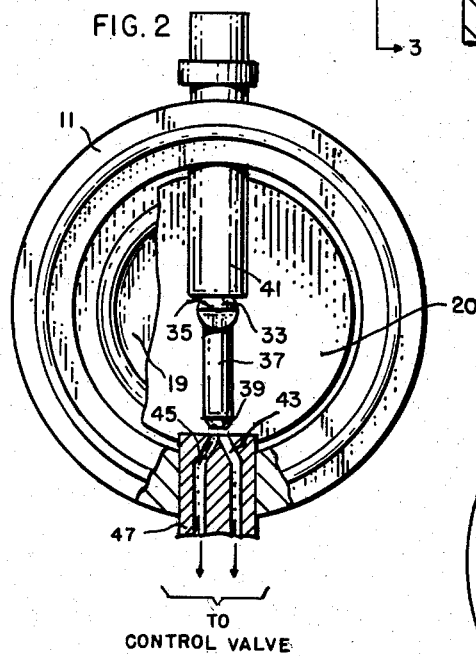
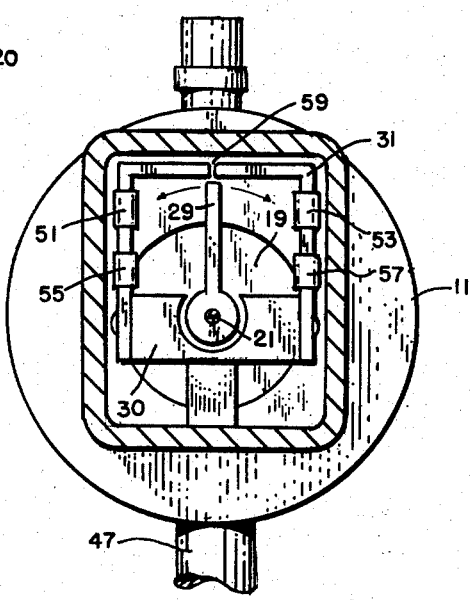
INVENTOR,
OLAF A. GUZMANN
BY Harry M. Saragovitz
ATTORNEY.

United States Patent Office 2,896,654
Patented July 28, 1959

2,896,654

TORSIONALLY MOUNTED JET PIPE RELAY

Olaf A. Guzmann, Long Branch, N.J.

Application August 11, 1958, Serial No. 754,505

4 Claims. (Cl. 137—83)

(Granted under Title 35, U.S. Code (1952), sec. 266)

The invention described herein may be manufactured and used by or for the Government for governmental purposes, without the payment of any royalty thereon.

The present invention relates to a hydraulic servo-mechanism control device or relay. More specifically, the invention relates to an improved embodiment of the so-called jet pipe relay control mechanism.

Broadly, devices of the jet pipe relay type have been in use for long periods of time and many modifications have been made to better their performance. The major portion of these efforts have been devoted toward increasing sensitivity, efficiency and response characteristics.

It is an object of the present invention to practically eliminate the effect of frictional interference or effects acting in opposition to or disturbing the control force applied to the relay.

It is a further object of the invention to eliminate or greatly reduce turbulence effects from the pressure stream from the jet pipe control nozzle.

It is a still further object of the invention to reduce the reactive forces acting upon the control structure and to eliminate deleterious effects which would otherwise be exerted thereby.

Yet another object of the invention is to reduce the inertia of the control pipe nozzle to a minimum.

Other objects and many attendant advantages of the present invention will become readily apparent as the same becomes better understood from the following detailed description and the accompanying drawings, wherein:

Fig. 1 is a view partly in section of an improved jet pipe relay device constructed in accordance with the principles of the invention;

Fig. 2 is a right side view of the jet pipe relay device of Fig. 1 with the cover plate removed and having a portion thereof shown in section along the line 2—2 of Fig. 1; and Fig. 3 is a sectional view of the device of Fig. 1, taken along the line 3—3 to show the torque motor structure thereof.

Referring now to Fig. 1 it will be seen that the improved jet pipe relay is formed of a main housing block 11, sealed by cover plates at either end and partially divided into two pressure chambers 13 and 15 by a centrally located wall 17. The wall section 17 has an orifice therein which is sealed by a diaphragm member 19 of an impervious oilproof elastic material such as neoprene or the like. The diaphragm, which is circular in shape, in molded with a gasket type edge on its periphery and is secured to the housing by means of a shielding and clamping member 20. The member 20 may be secured to the housing by any suitable means such as cap screws (not shown) threaded into tapped holes in the wall section 17.

An actuating or input shaft 21 for the jet pipe relay has an enlarged portion 23 thereof sealed to the diaphragm, substantially at the center. The diaphragm is of substantially uniform thickness and may be tightly bonded at the center to the enlarged shaft section by any means known to those skilled in the art. The shaft 21 is mounted to rotate in precision instrument type ball bearings 25 and 27 secured to the housing 11, but is restrained from complete rotation by being bonded to the diaphragm as will be more fully explained hereinafter.

The shaft 21 is rigidly attached to the armature 29 of an electrical torque motor having a stator 31. The details of this torque motor structure are illustrated more clearly in Fig. 3. The mechanical rotation of the shaft 21 caused by the input quantity may be produce in any manner whatsoever without departing from the scope of the present invention.

The opposite end of the shaft 21 carries a jet rotor structure made up of a hub section 33 securely pinned or otherwise affixed to the shaft. The hub 33 is cut away at the outboard end thereof to form a flat surface 35, the plane of which lies upon the centerline of the shaft 21. The member 33 is drilled on the centerline of the shaft at right angles to the surface 35 and a rotor tube 37 is rigidly secured in the drilled hole by soldering, welding, brazing or other equivalent means. The rotor tube 37 is flush with the surface 35 at one end and is formed with an accurately machined bore having straight parallel sides and a constant diameter. The outer portion of the tube ends in a taper section 39.

One method which has been used to insure proper alignment of the rotor tube is to tin the mating areas of the tube and element 35. The rotor tube is then inserted in position in the element 35 and a dummy plug accurately drilled at the center thereof is inserted in place of element 47. A rod having the same diameter as jet orifice 42 and the bore of rotor tube 37 is then inserted through these elements and the drilled hole in the dummy plug. Heat is applied to fuse the solder and after cooling the rod is withdrawn. Substantially perfect alignment is thus obtained.

A jet stator or input nozzle 41 is fixedly mounted in the housing 11 passing through a hole drilled in the wall of the chamber 15. The jet stator nozzle, which may be of the low-turbulence type described in the copending application of Olaf A. Guzmann, Serial No. 714,005, filed Jan. 31, 1958, for "Nozzle," has its bore 42 aligned with and its discharge nozzle end closely adjacent to the end of the rotor tube 37 when the shaft 21 is in its neutral or center position.

The jet rotor tube at its remote or mushroom shield end cooperates with a pair of receiver ports 43 and 45 drilled in a distributor block 47 fastened in the housing 11 at the lower wall of chamber 15. The receiver ports, and their cooperative relationship with the jet rotor tube 37 is best illustrated in Fig. 2 of the drawings. As the legend at the lower portion of this figure indicates the receiver nozzles are connected to channels which in turn lead to the control valve of a hydraulic servo system. This connection forming no part of the present invention has not been specifically shown.

The chamber 11 contains an electrical torque motor, the armature 29 of which is rigidly attached to the shaft 21 (see Fig. 3).

The armature 29 is shown in its neutral position. The armature is operated through a narrow angular range (approximately one and one half degrees) either side of its neutral position by a stator structure 31 carrying actuating coils 51, 53, 55 and 57. The narrow air gap 59 in the stator structure determines the maximum extent of angular movement and within this range lesser degrees of movement can be obtained depending upon the degree of energization of the coils. The mode of operation of the general type of torque meter illustrated is well known in the art (see the patent to Askew 2,786,174, issued March 19, 1957 for example), but the specific operation thereof in the disclosed system will be pointed out hereinafter. Coils 53 and 55 may be used to control the original displacement of the armature by differential energization thereof and coils 55 and 57 may be used to apply restoring or nulling torque. The restoring torque would be applied by controlling the differential energization of coils 55 and 57 by some instrumentality actuated by a servo motor controlled by the control valve indicated but not shown in Fig. 2.

The two chambers 13 and 15 are connected by a passage 61, the end of the passage nearest chamber 15 being restricted by a drilled filter plug 63. The orifice or drilled opening in the filter plug 63 is of sufficient size to permit equalization of pressure between the two chambers yet small enough to prevent the passage of any foreign particles carried by hydraulic fluid with which both chambers are filled when the relay is in operation.

Chamber 13 is equipped with a filling plug 65 while chamber 15 has an exhaust port 67 the effective opening of which may be controlled by a needle valve 69. The chamber 13 is initially filled with oil or other hydraulic fluid when the system is placed in operation while chamber 15 is filled by means of oil or fluid under pressure applied through the input or jet stator nozzle 41. The excess fluid entering chamber 15, as will be more fully explained hereinafter, is allowed to escape through the exhaust port 67. The chamber 15 may also be provided with a pressure gage 71 and the pressure within the chamber may be adjusted by controlling the needle valve 69.

The mode of operation of the jet pipe relay described above will now be set forth and the attendant advantages pointed out.

Assume that the currents flowing in coils 51 and 53 have been unbalanced by some instrumentality controlling so that the flux produced by coil 51 is greater than that produced by coil 53. The armature 29 will be deflected in a counterclockwise direction as viewed in Fig. 3 in such a manner as to tend to align itself with the stronger flux field. This rotation will cause the shaft 21 to rotate in its bearings 25 and 27 against a counter torque exerted by the elastic diaphragm 19. Due to the relatively small permissible movement of the torque motor armature the counter torque or opposition force developed by the elastic diaphragm will be substantially linear throughout the entire movement range. The pipe hub 33 and the jet rotor pipe also carried by the shaft will have no frictional forces to overcome other than those of the instrument type bearings 25 and 27 and a negligible amount of internal friction developed within the diaphragm structure.

The above movement of shaft 21 displaces the jet rotor pipe 37 causing it to be more nearly aligned with the receiver port 43. Oil or hydraulic fluid is being supplied meanwhile through the jet stator 41 discharging through the bore 42 and is deflected by the rotor tube 37 to the receiver port 43 causing an excess of pressure over that supplied to port 45. This excess pressure in the port 43 will cause movement of the control valve (not shown) in a manner well known in the art and the control valve in turn controls the operation of the main servo motor (not shown). An opposite energization of the coils 51 and 53 will, of course, cause the armature 29 to rotate in the opposite direction and the pressure in port 45 will then predominate over that in port 43 to cause movement of the control valve in the opposite direction. The coils 55 and 57, as previously explained, may be differentially energized by action of the servo motor to exert a restoring or nulling torque on the armature 29 and the rotor tube 37.

The structure of the novel jet pipe relay and the broad phases of its operation having been pointed out above attention is now directed to the more specific details of operation of the various disclosed elements and the advantages obtained thereby.

As has been pointed out in the above-mentioned co-pending application Serial No. 714,005, conventional jet nozzles tend to produce turbulence effects when operated at pressures in excess of one hundred pounds per square inch. For this reason the type of nozzle illustrated at 41 with a bore 42 located in a wall normal to the direction of fluid flow has been chosen. When the diameter of the bore 42 is substantially equal to the thickness of the wall through which it is drilled the turbulence effects are minimized and input pressures up to 1000 pounds per square inch can be utilized.

A further beneficial effect is obtained by directing the jet stream from the bore 42 into the chamber 15, which is maintained under pressure in the following manner. Oil or other hydraulic fluid entering the chamber 15 in the jet stream can escape from the chamber only through the ports 43 and 45 or the other two openings therein, the one in the filter plug 63 and that through the exhaust port 67. The filter outlet leads to the chamber 13 which is also sealed and filled with fluid. Substantially no fluid can escape therefore through this passage under normal conditions of operation. The ports 43 and 45 are closed at the ends by the piston chambers of the control valve and any flow therethrough is only transitory when pressures cause piston movement. The entering fluid must, therefore, escape through the exhaust port 67, the effective size of which may be controlled by the setting of the needle valve 69. This throttling action of the valve 69 may be used to control the pressure within the chamber 15.

A jet stream is usually accompanied by gas bubbles entrained in the fluid. When the stream impinges upon a surface these gas bubbles are freed in a "boilnig action" which creates turbulence and resultant jitter motion of the piston chamber within which the jet stream is operated is arranged to be filled with fluid under pressure, the turbulence caused by the release of gas bubbles may be greatly reduced. The needle valve 69 located in the exhaust port 67 constitutes a convenient means for adjusting the chamber pressure to secure optimum operating conditions.

It will be noted that the torque motor is constructed with its stator in the form of a square with the armature 29 pivoted midway of one side thereof in a cut-away portion of a block of magnetic material 30. The remaining sides of the square are formed by the leg portions 31 having a narrow gap in the side opposite the pivot. This construction limits the extent of movement of the armature 29 to a very narrow angle since after it swings to one side of the gap or the other any further movement would tend to widen the gap between the stator and the armature structure. In an actual structure this angle of swing has been held to an angle of 1.5 degrees either side of the center or neutral position. No matter how great the current differential becomes in the coils this narrow angular movement will not be exceeded. The actual extent of movement is, of course, determined by the size of the stator square, the length of the armature and the width of the gap 59 between the leg members 31.

The above described construction of the torque motor thus serves to place a limit of angular rotation upon the shaft 21 and the hub member 33 and rotor pipe 37 attached thereto. This allows a close spacing between the jet bore 42 and the upper end of the rotor pipe and ensures that the rotor pipe can never be sufficiently misaligned with the jet stream to cause the generation of turbulence.

As previously pointed out the upper end of the jet pipe rotor 37 is flush with the surface 35 of the hub member 33. The plane of surface 35 lies along the centerline of the shaft 21. This results in overcoming an inherent defect of many prior jet pipe relays. When a normal jet pipe is deflected the jet stream impinging thereon sets up reaction effects upon the device producing the deflecting torque. In the disclosed structure this force can act only upon the very short moment arm presented by the rotor pipe 37 and its effect is therefore small.

A further advantage obtained by the use of the short rotor pipe 37 is that of reducing the moment of inertia of the moving pipe system. The rotor pipe 37 is not only short in length but can be made with thin walls of some material such as stainless steel and is hence very light in weight. The entire moving system has been reduced to a minimum.

The diaphragm member 19 serves several purposes. It forms a sealing member between the chambers 13 and 15. The chamber 13 houses the torque motor with its delicate bearings 25 and 27. These bearings if exposed to the circulating oil of the system would soon be damaged or lose their anti-friction qualities because of the microscopic particles of dirt and foreign matter carried by the oil stream. The diaphragm member seals off the torque motor chamber 13 from the flowing oil in chamber 15 and thus protects the bearings and small magnetic air gaps from contamination. The pressure between the chambers is maintained equal by the passage 61 but the filter plug 63 will prevent the entry of foreign matter.

The diaphragm 19 is formed of elastic material securely clamped at its peripheral gasket edge. It is securely attached at the center to the shaft 21. The shaft can rotate therefore by slightly deforming the diaphragm structure and in so doing causes the diaphragm to act as a torsion member or spring tending to restore the shaft 21 to its neutral position. Within the limited angular motion permitted the restoring torque thus applied bears a substantially linear relationship to the extent of angular movement.

The rigid attachment of the diaphragm 19 to the shaft 21 eliminates any frictional effect that would be presented by a bearing or rotary seal structure. The frictional forces in the instrument bearings 25 and 27 and any internal friction in the material of the diaphragm 19 are so slight as to be practically negligible. The frictional loading of the torque motor applying the controlling movement is thus very small.

The above description relates to a presently preferred embodiment of the invention. Other embodiments and modifications will, of course, occur to those skilled in the art and it is desired to cover in the appended claims all such changes as fall within the true scope and spirit of the invention.

What is claimed is:

1. In a jet pipe relay mechanism, a housing divided into a pair of chambers by a rotary-flexible diaphragm member, an input shaft attached to and passing through said diaphragm member, a torque motor located in one chamber and attached to said input shaft, a hydraulic jet nozzle located in said other chamber and disposed at right angles to said input shaft, a jet rotor attached to said input shaft with one end thereof being substantially at the shaft axis and in proximity to the said jet nozzle, a pair of ports located in said housing adjacent the other end of said rotor pipe, a restricted passage between said chambers, an exhaust port in said second chamber and adjustable valve means to control the effective area of said exhaust port.

2. In a jet pipe relay mechanism comprising a housing divided into first and second chambers by a rotary-flexible diaphragm member, an input shaft attached to and passsing through said diaphragm member, means located in a first one of said chambers to apply a limited rotary motion to said input shaft, a jet nozzle mounted in the wall of said housing with its orifice located in the other of said chambers and directed substantially at right angles to said input shaft, a jet pipe rotor attached at one end to said shaft in proximity to said nozzle orifice, a distributor block located in said housing and having ports therein adjacent the other end of said jet pipe rotor, an exhaust port in said second chamber and adjustable means to control the effective area of said exhaust port.

3. In a jet pipe relay mechanism comprising a housing divided into first and second chambers by a flexible planar diaphragm member, an input shaft passing through said diaphragm normal to the phase thereof and attached thereto, means located in a first one of said chambers to apply a limited rotary motion to said input shaft, a jet nozzle fixedly mounted in the wall of said housing with its orifice located in the other of said chambers and directed substantially at right angles to said input shaft a jet pipe rotor carried by said input shaft and substantially aligned with said jet nozzle to receive and direct fluid discharged therefrom and adjustable means to control the fluid pressure within said other chamber.

4. A jet pipe relay mechanism in accordance with claim 3 wherein said means for applying limited rotary motion to said input shaft is a magnetic torque motor having a narrow air gap in its magnetic stator structure.

No references cited.